(12) United States Patent
Jang et al.

(10) Patent No.: US 7,803,897 B2
(45) Date of Patent: Sep. 28, 2010

(54) PROCESS FOR PREPARING POLYKETONE

(75) Inventors: Jean-Young Jang, Kyonggi-do (KR);
Jong-In Choi, Kyonggi-do (KR);
Hae-Souk Cho, Kyonggi-do (KR);
Jae-Yoon Shim, Kyonggi-do (KR);
Sung-Kyun Yoon, Kyonggi-do (KR);
Heon-Su Kim, Kyonggi-do (KR);
Toniolo Luigi, Kyonggi-do (KR);
Vavasori Andrea, Kyonggi-do (KR)

(73) Assignee: Hyosung Corporation, Kyonggi-do (KR)

( * ) Notice: Subject to any disclaimer, the term of this patent is extended or adjusted under 35 U.S.C. 154(b) by 620 days.

(21) Appl. No.: 11/826,098

(22) Filed: Jul. 12, 2007

(65) Prior Publication Data
US 2008/0161531 A1  Jul. 3, 2008

(30) Foreign Application Priority Data
Dec. 28, 2006  (KR) .................... 10-2006-0136686

(51) Int. Cl.
*C08G 67/02* (2006.01)
*C08G 2/16* (2006.01)
(52) U.S. Cl. .............. 528/392; 528/220; 528/222; 528/223; 528/486; 528/499; 528/502 C; 528/503
(58) Field of Classification Search .............. 528/220, 528/222, 223, 392, 486, 499, 502 C, 503
See application file for complete search history.

(56) References Cited

U.S. PATENT DOCUMENTS 4,933,311 A  6/1990  Van Doorn et al.

FOREIGN PATENT DOCUMENTS

| EP | 0 319 083 | 6/1989 |
|---|---|---|
| EP | 0 361 584 | 4/1990 |
| EP | 1 460 097 A1 | 9/2004 |
| JP | 04-227726 | 8/1992 |
| JP | 05-140301 | 6/1993 |
| JP | 06-510552 | 11/1994 |
| JP | 08-283403 | 10/1996 |
| JP | 2002-317044 | 10/2002 |
| JP | 2003-096187 A | 4/2003 |
| KR | 2006-0057719 A | 5/2006 |
| KR | 10-0652073 B | 11/2006 |

OTHER PUBLICATIONS

Claims of U.S. Appl. No. 11/706,407.*
Claims of U.S. Appl. No. 11/706,408.*

* cited by examiner

*Primary Examiner*—Duc Truong
(74) *Attorney, Agent, or Firm*—Nixon & Vanderhye P.C.

(57) ABSTRACT

The present invention relates to a process for preparing polyketone with improved catalytic activity and intrinsic viscosity, and specifically a process for preparing polyketone, using a mixed solvent of 40 to 60 mol % acetic acid and 40 to 60 mol % water, as a liquid medium, and the precursor of palladium chloride-1,3-bis[di(methoxyphenyl)phosphino]propane, as a catalyst component.

2 Claims, No Drawings

PROCESS FOR PREPARING POLYKETONE

TECHNICAL FIELD

The present invention relates to a process for preparing polyketone with improved catalytic activity and intrinsic viscosity, and specifically a process for preparing polyketone with the copolymerization of carbon monoxide and an ethylenically unsaturated compound in a liquid medium in the presence of a catalyst, which is an organometallic complex comprising (a) a Group 9, Group 10 or Group 11 transition metal complex and (b) a ligand containing a Group 15 element comprising 1,3-bis[di(methoxyphenyl)phosphino]propane, and a mixed solvent of 40 to 60 mol % acetic acid and 40 to 60 mol % water is used as the liquid medium.

A copolymer of carbon monoxide and an ethylenically unsaturated compound, particularly a polyketone in which a repeating unit derived from carbon monoxide and a repeating unit derived from an ethylenically unsaturated compound are alternately linked to each other has a excellent performance in terms of mechanical thermal property, abrasion resistance, chemical resistance, and gas barrier ability. Therefore it is useful for a variety of applications. Moreover, a polymer of the alternately copolymerized polyketone has much higher mechanical and thermal property, and is useful as an economically available engineering plastic material. In particular, the high abrasion resistance makes it useful as a part in vehicles such as a gear due to; its high chemical resistance makes it useful as a lining material for a chemical transferring pipe; and its high gas barrier ability makes it useful as a light gasoline tank such as a lining material. Furthermore, if an ultra-high molecular weight polyketone having intrinsic viscosity of 2 or more is used for fibers, a high stretch ratio can be obtained, and a fiber with high strength and high elasticity, aligned in the elongation direction, may be prepared. Thus, the produced fiber may be desirably used as building materials or industrial materials such as a reinforcement material for a belt, a rubber hose, a tire cord and a concrete reinforcement material.

BACKGROUND ART

As a process for obtaining a high molecular weight polyketone which exhibits with a high mechanical thermal property, EP Patent No. 319083 discloses a process of polymerization at a lower temperature, using a catalyst comprising palladium, 1,3-bis[di(2-methoxyphenyl)phosphino]propane and anion. Another method using a catalyst comprising palladium, 2-(2,4,6-trimethylbenzene)-1,3-bis[di(2-methoxyphenyl)phosphino]propane and anion is disclosed in JP-A No. H4-227726. JP-A No. H5-140301 discloses another process using a catalyst comprising palladium, 2-hydroxy-1,3-bis[di(2-methoxyphenyl)phosphino]propane and anion. By any of these processes, however, a yield of the polyketone obtained per a catalyst is low and it is difficult to synthesize a phosphor ligand and those processes are costly, thereby it being economically problematic.

As a process of obtaining a high molecular weight polyketone using an inexpensive catalyst, a process comprising performing polymerization in a solvent of tert-butanol using a catalyst comprising palladium, 1,3-bis(diphenylphosphino)propane and an anion of boron-based fluorides is disclosed in JP-A No. H6-510552. High molecular weight polyketone is obtained in this process, but the yield of the polyketone obtained per a catalyst is very low, and as a result the cost of polyketone is increased, thereby it being problematic.

As a process for obtaining a high molecular weight polyketone economically, a process comprising performing polymerization in a mixed solvent of methanol and 1 to 50 vol % of water is disclosed in JP-A No. H8-283403. In this process, a catalyst comprising a Group 10 element such as palladium, 1,3-bis(diphenylphosphino)propane and an anion of an inorganic acid is used. In particular, in the case of using palladium acetate, 1,3-bis(diphenylphosphino)propane and phosphotungstic acid in a solvent of methanol with 17 vol % of water, a polymer with an intrinsic viscosity of 1.36 is obtained at 85° C. at 4.8 MPa of an equimolar mixed gas of ethylene and carbon monoxide for 30 min. At that time, catalytic activity is 5.7 kg/g-Pd·hr. If sulfuric acid is used for the mixed solvent, instead of phosphotungstic acid, catalytic activity is 9.5 kg/g-Pd·hr. According to this process, due to high catalytic activity, relatively high molecular weight polyketone is obtained, but even with a longer polymerization time, it would be impossible to obtain a polymer with intrinsic viscosity of 2 or more, which is required to be used as a high performance material.

EP Patent No. 0361584 discloses a process comprising performing polymerization at a lower pressure using palladium, 1,3-bis(diphenylphosphino)propane and trifluoroacetic acid. According to this process, a polymer with catalytic activity of 1.3 kg/g-Pd·hr, and intrinsic viscosity of 1.8 can be obtained by polymerization at an input ratio of 1:2 of ethylene and carbon dioxide at 50° C. and at 4 MPa for 5.2 hours. By this process, a polyketone can be obtained at relatively low temperature and low pressure, but it is be impossible to obtain a polymer with high intrinsic viscosity, which is required to be used as a high performance material.

JP-A No. 2002-317044 discloses a method of using sulfuric acid as an inorganic acid in a catalyst system which is similar to those in the prior art. In this process, polymer with an intrinsic viscosity of 6.45 is obtained by polymerization of a Group 10 element such as palladium and 1,3-bis(diphenylphosphino)propane in a solvent of methanol at 80° C. at 5.5 MPa of an equimolar mixed gas of ethylene and carbon monoxide for 30 min. At that time, catalytic activity is 6.0 kg/g-Pd·hr.

Under these conditions, in a process of preparing polyketone using carbon monoxide and an ethylenically unsaturated compound, there is real demand for developing a technique for preparing polyketone having high catalytic activity as well as high intrinsic viscosity suitable for a tire cord.

In order to solve the above-mentioned problems, it is an object of the present invention to provide a process for preparing polyketone, with improved catalytic activity and intrinsic viscosity for a shorter polymerization time, by using a mixed solvent of 40 to 60 mol % acetic acid and 40 to 60 mol % water, as a liquid medium, and the precursor of palladium chloride compound 1,3-bis[di(methoxyphenyl)phosphino]propane, as a catalyst.

DISCLOSURE OF THE INVENTION

The present invention relates to a process for preparing polyketone comprising copolymerization of carbon monoxide and an ethylenically unsaturated compound in a liquid medium in the presence of a catalyst, which is an organometallic complex comprising (a) a Group 9, Group 10 or Group 11 transition metal complex and (b) a ligand containing a Group 15 element. The component (a) is palladium chloride and the component (b) is bis[di(methoxyphenyl)phosphino]propane, and the present invention is a process for preparing polyketone using the catalyst precursor comprising (a) and (b).

According to a preferred embodiment of the present invention, a mixed solvent of 40 to 60 mol % acetic acid and 40 to 60 mol % water is used as the liquid medium.

According to a preferred embodiment of the present invention, the input molar ratio of (a) and (b) is preferably 1:1.

The present invention is characterized by the use of a mixed solvent of acetic acid and water, as a liquid medium, which is different from prior arts which mainly use methanol, dichloromethane or nitromethane. According to the present invention, the use of a mixed solvent of acetic acid and water, as a liquid medium, reduces the production cost of polyketone and increases catalyst activity.

It is desirable to use a mixed solvent of 40 to 60 mol % acetic acid and 40 to 60 mol % water, and it is more preferable to use 60 mol % acetic acid and 40 mol % water.

In the present invention, the catalyst comprises (a) a Group 9, Group 10 or Group 11 transition metal complex (IUPAC, Inorganic chemical nomenclature recommendations, revised in 1989), and (b) a ligand containing a Group 15 element.

Examples of the Group 9 transition metal complex among (a) the Group 9, Group 10 or Group 11 transition metal complexes include a cobalt or ruthenium complex, carboxylate, phosphonate, carbamate and sulfonate. Specific examples thereof include cobalt acetate, cobalt acetylacetate, ruthenium acetate, ruthenium trifluoroacetate, ruthenium acetylacetate, and ruthenium trifluoromethane sulfonate.

Examples of the Group 10 transition metal complex include a nickel or palladium complex, carboxylate, phosphonate, carbamate, and sulfonate. Specific examples thereof include nickel acetate, acetylacetate nickel, palladium acetate, palladium trifluoroacetate, palladium acetylacetate, palladium chloride, bis(N,N-diethylcarbamate)bis(diethylamine)palladium, and palladium sulfate.

Examples of the Group 11 transition metal complex include a copper or silver complex, carboxylate, phosphonate, carbamate, and sulfonate. Specific examples thereof include copper acetate, copper trifluoroacetate, copper acetylacetate, silver acetate, silver trifluoroacetate, silver acetylacetate, and silver trifluoromethane sulfonate.

Among them, nickel and copper compound are inexpensive and economically preferable transition metal complexes (a), and a palladium compound is a preferable transition metal complex (a) in terms of the yield and the molecular weight of polyketone. The present invention offers a method of improving catalytic activity and intrinsic viscosity by using palladium chloride complex.

Examples of the ligand (b) containing a Group 15 element include a nitrogen ligand such as 2,2'-bipyridyl, 4,4'-dimethyl-2,2'-bipyridyl, 2,2'-bi-4-picoline and 2,2'-biquinoline; and a phosphorous ligand such as 1,2-bis(diphenylphosphino)ethane, 1,3-bis(diphenylphosphino)propane, 1,4-bis(diphenylphosphino)butane, 1,3-bis[di(2-methyl)phosphino]propane, 1,3-bis[di(2-isopropyl)phosphino]propane, 1,3-bis[di(2-methoxyphenyl)phosphino]propane, 1,3-bis[di(2-methoxy-4-sodium sulfonate-phenyl)phosphino]propane, 1,2-bis(diphenylphosphino)cyclohexane, 1,2-bis(diphenylphosphino)benzene, 1,2-bis[(diphenylphosphino)methyl]benzene, 1,2-bis[[di(2-methoxyphenyl)phosphino]methyl]benzene, 1,2-bis[[di(2-methoxy-4-sodium sulfonate-phenyl)phosphino]methyl]benzene, 1,1'-bis(diphenylphosphino)ferrocene, 2-hydroxy-1,3-bis[di(2-methoxyphenyl)phosphino]propane, 2,2-dimethyl-1,3-bis[di(2-methoxyphenyl)phosphino]propane, 1,3-bis(diphenylphosphino)ferrocene, and 1,3-bis[bis(2-methoxy-5-methylphenyl)phosphino]propane.

The present invention is characterized by the use of 1,3-bis[di(methoxyphenyl)phosphino]propane as a ligand (b) containing a Group 15 element shown in the formula (I), which is different from prior arts. By using the catalyst of 1,3-bis[di(methoxyphenyl)phosphino]propane, a polyketone having high catalytic activity may be prepared.

In the present invention, the precursor of palladium chloride and 1,3-bis[di(methoxyphenyl)phosphino]propane is used as a catalyst, and a mixed solvent of 40 to 60 mol % acetic acid and 40 to 60 mol % water is used as a liquid medium and, as a result, catalytic activity is improved for a shorter polymerization time.

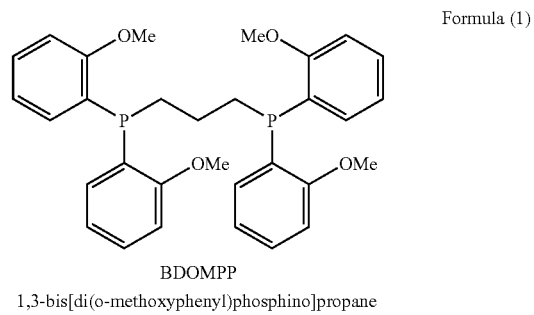

Formula (1)

BDOMPP
1,3-bis[di(o-methoxyphenyl)phosphino]propane

The amount of the Group 9, Group 10 or Group 11 transition metal complex (a) to be used suitably varies depending on the kind of the selected ethylenically unsaturated compound or other polymerization conditions. Accordingly, the range of the amount may not be limited to a specific value, but usually it is preferably in the range of 0.01 to 100 mmol, and more preferably in the range of 0.01 to 10 mmol, per 1 liter of the capacity of the reaction zone. The capacity of the reaction zone refers to a capacity of the liquid phase in the reactor.

The amount of the ligand (b) is not particularly limited, but usually it is preferable to use 1~3 mol per 1 mol of the transition metal complex (a). And it is more preferable to use 1 mol per 1 mol of the transition metal complex (a).

In the present invention, examples of the ethylenically unsaturated compound to be copolymerized with carbon monoxide include an α-olefin such as ethylene, propylene, 1-butene, 1-hexene, 4-methyl-1-pentene, 1-octene, 1-decene, 1-dodecene, 1-tetracene, 1-hexadecene, and vinylcyclohexane; an alkenyl aromatic compound such as styrene, and a-methylstyrene; a cyclic olefin such as cyclopentene, norbornene, 5-methylnorbornene, 5-phenylnorbornene, tetracyclododecene, tricyclododecene, tricycloundecene, pentacyclopentadecene, pentacyclohexadecene, and 8-ethyltetracyclododecene; vinyl halide such as vinyl chloride; acrylic acid ester such as ethylacrylate, and methylacrylate. These ethylenically unsaturated compounds may be used singly or in a mixture. Among these, the α-olefin is preferable as the ethylenically unsaturated compound and an olefin having 2 to 4 carbon atoms is more preferable, and ethylene is the most preferable.

In the present invention, the input molar ratio of carbon monoxide and the ethylenically unsaturated compound is preferably 1:1. In the present invention, copolymerization of carbon monoxide and the ethylenically unsaturated compound occurs in the presence of an organometallic complex comprising a Group 9, Group 10 or Group 11 transition metal complex (a) and a ligand (b) containing a Group 15 element.

The catalyst is produced by bring the above-described two components into contact. The method of bring the components into contact is described in prior known arts. For example, it is available to preliminarily mix two components in a suitable solvent into a solution and then use them; or to separately supply two components to a polymerization system, wherein they are then brought into contact. In the present invention, (a) and (b) are mixed to produce a catalyst precursor, which results in improving catalyst activity and intrinsic viscosity simultaneously.

When the present invention is carried out, as the polymerization method, a solution polymerization method using a liquid medium, a suspension polymerization method and a gas phase polymerization method comprising impregnating a small amount of polymer with a catalyst solution having a high concentration may be used. Polymerization is preferably carried out in either a batch mode or a continuous mode. As a reactor used for polymerization, a reactor described in prior known arts may be used or it may be used after being modified. There is no particular restriction on the polymerization temperature, but it is generally in the range of 40 to 180° C., and preferably in the range of 50 to 120° C. There is no restriction on the pressure upon polymerization, but it is generally in the range of the normal pressure to 20 MPa, and preferably in the range of 4 to 15 MPa.

Hereinafter, the constitution and the effects of the present invention will be described in detail with reference to Examples and Comparative Examples. These Examples are provided only for the illustrative purpose, and it should not be construed that the scope of the invention is limited thereto. In Examples and Comparative Examples, the intrinsic viscosity and the catalytic activity are evaluated in the following methods.

(1) Intrinsic Viscosity

The polymerized resin is dissolved in a thermostat at 60° C. at a concentration of 0.01 g/100 ml to 1 g/100 ml (m-cresol) for 1 to 5 hours, and then the viscosity is measured using an Ubbelohde viscometer at 30° C. The viscosities vs. the concentrations are plotted and extrapolated to determine an intrinsic viscosity.

(2) Catalytic Activity

The catalytic activity is determined by the weight of the polymerized resin/the weight of palladium-time (g/g-Pd·hr).

EXAMPLES

Example 1

0.60 mg of the precursor of palladium chloride-1,3-bis[di(methoxyphenyl)phosphino]propane was dissolved in the mixture of 36 ml of acetic acid and 44 ml of water. After removing the air from the obtained solution under vacuum, the solution was charged into a stainless-steel autoclave which had been purged with nitrogen. After sealing the autoclave, the contents were heated under stirring at a speed of 700 rpm. When the internal temperature reached 90° C., a mixed gas of carbon monoxide and ethylene (the molar ratio of 1:1) was added until the internal pressure of the autoclave became 110 atm. The contents were stirred for 1 hour while the internal temperature and the internal pressure were maintained at 90° C. and 110 atm, respectively. After cooling, the contents were taken out from the autoclave which had been degassed. The solution was filtered and then washed with methanol several times. The solution was dried under reduced pressure at room temperature to 80° C., to obtain 20.6 g of a polymer.

The results of $^{13}$C-NMR and IR confirmed that the polymer was polyketone which substantially consists of repeating units each derived from carbon monoxide and ethylene. The catalytic activity was equal to 22300 g/g-Pd·hr, and the intrinsic viscosity was 3.8 dl/g.

The results are summarized in Table 1.

Example 2

0.60 mg of the precursor of palladium chloride-1,3-bis[di(methoxyphenyl)phosphino]propane was dissolved in the mixture of 36 ml of acetic acid and 44 ml of water. After removing the air from the obtained solution under vacuum, the solution was charged into a stainless-steel autoclave which had been purged with nitrogen. After sealing the autoclave, the contents were heated under stirring at a speed of 700 rpm. When the internal temperature reached 80° C., a mixed gas of carbon monoxide and ethylene (the molar ratio of 1:1) was added until the internal pressure of the autoclave became 110 atm. The contents were stirred for 1 hour while the internal temperature and the internal pressure were maintained at 80° C. and 110 atm, respectively. After cooling, the contents were taken out from the autoclave which had been degassed. The solution was filtered and then washed with acetone several times. The solution was dried under reduced pressure at room temperature to 80° C., to obtain 12.60 g of a polymer.

The results of $^{13}$C-NMR and IR confirmed that the polymer was polyketone which substantially consists of repeating units each derived from carbon monoxide and ethylene. The catalytic activity was equal to 14000 g/g-Pd·hr, and the intrinsic viscosity was 6.1 dl/g.

The results are summarized in Table 1.

Example 3

0.60 mg of the precursor of palladium chloride-1,3-bis[di(methoxyphenyl)phosphino]propane was dissolved in the mixture of 36 ml of acetic acid and 44 ml of water. After removing the air from the obtained solution under vacuum, the solution was charged into a stainless-steel autoclave which had been purged with nitrogen. After sealing the autoclave, the contents were heated under stirring at a speed of 700 rpm. When the internal temperature reached 70° C., a mixed gas of carbon monoxide and ethylene (the molar ratio of 1:1) was added until the internal pressure of the autoclave became 45 atm. The contents were stirred for 1 hour while the internal temperature and the internal pressure were maintained at 70° C. and 45 atm, respectively. After cooling, the contents were taken out from the autoclave which had been degassed. The solution was filtered and then washed with acetone several times. The solution was dried under reduced pressure at room temperature to 80° C., to obtain 9.89 g of a polymer.

The results of $^{13}$C-NMR and IR confirmed that the polymer was polyketone which substantially consists of repeating units each derived from carbon monoxide and ethylene. The catalytic activity was equal to 11000 g/g-Pd·hr, and the intrinsic viscosity was 3.3 dl/g.

The results are summarized in Table 1.

Example 4

0.60 mg of the precursor of palladium chloride-1,3-bis[di(methoxyphenyl)phosphino]propane was dissolved in the mixture of 36 ml of acetic acid and 44 ml of water. After removing the air from the obtained solution under vacuum, the solution was charged into a stainless-steel autoclave which had been purged with nitrogen. After sealing the autoclave, the contents were heated under stirring at a speed of 700 rpm. When the internal temperature reached 60° C., a mixed gas of carbon monoxide and ethylene (the molar ratio of 1:1) was added until the internal pressure of the autoclave became 110 atm. The contents were stirred for 4 hour while the internal temperature and the internal pressure were maintained at 60° C. and 110 atm, respectively. After cooling, the contents were taken out from the autoclave which had been degassed. The solution was filtered and then washed with acetone several times. The solution was dried under reduced pressure at room temperature to 80° C., to obtain 14.4 g of a polymer.

The results of $^{13}$C-NMR and IR confirmed that the polymer was polyketone which substantially consists of repeating units each derived from carbon monoxide and ethylene. The catalytic activity was equal to 4000 g/g-Pd·hr, and the intrinsic viscosity was 11.1 dl/g.

The results are summarized in Table 1.

Example 5

0.60 mg of the precursor of palladium chloride-1,3-bis[di(methoxyphenyl)phosphino]propane was dissolved in the mixture of 48 ml of acetic acid and 32 ml of water. After removing the air from the obtained solution under vacuum, the solution was charged into a stainless-steel autoclave which had been purged with nitrogen. After sealing the autoclave, the contents were heated under stirring at a speed of 700 rpm. When the internal temperature reached 90° C., a mixed gas of carbon monoxide and ethylene (the molar ratio of 1:1) was added until the internal pressure of the autoclave became 110 atm. The contents were stirred for 2 hour while the internal temperature and the internal pressure were maintained at 90° C. and 110 atm, respectively. After cooling, the contents were taken out from the autoclave which had been degassed. The solution was filtered and then washed with acetone several times. The solution was dried under reduced pressure at room temperature to 80° C., to obtain 36.51 g of a polymer.

The results of $^{13}$C-NMR and IR confirmed that the polymer was polyketone which substantially consists of repeating units each derived from carbon monoxide and ethylene. The catalytic activity was equal to 20300 g/g-Pd·hr, and the intrinsic viscosity was 4.5 dl/g.

The results are summarized in Table 1.

Example 6

0.60 mg of the precursor of palladium chloride-1,3-bis[di(methoxyphenyl)phosphino]propane was dissolved in the mixture of 48 ml of acetic acid and 32 ml of water. After removing the air from the obtained solution under vacuum, the solution was charged into a stainless-steel autoclave which had been purged with nitrogen. After sealing the autoclave, the contents were heated under stirring at a speed of 700 rpm. When the internal temperature reached 70° C., a mixed gas of carbon monoxide and ethylene (the molar ratio of 1:1) was added until the internal pressure of the autoclave became 110 atm. The contents were stirred for 4 hour while the internal temperature and the internal pressure were maintained at 70° C. and 110 atm, respectively. After cooling, the contents were taken out from the autoclave which had been degassed. The solution was filtered and then washed with acetone several times. The solution was dried under reduced pressure at room temperature to 80° C., to obtain 21.95 g of a polymer.

The results of $^{13}$C-NMR and IR confirmed that the polymer was polyketone which substantially consists of repeating units each derived from carbon monoxide and ethylene. The catalytic activity was equal to 6100 g/g-Pd·hr, and the intrinsic viscosity was 10.3 dl/g.

The results are summarized in Table 1.

TABLE 1

| | I.V. (dl/g) | Catalytic Activity (kg/gPd · hr) | Amount produced (g) | Catalyst system [Amount of catalyst input (mg)] PdCl2-BDOMPP | Solvent (ml) acetic acid | Solvent (ml) water | Input ratio Ligand/pd | Rx Temp (° C.) | Rx Pressure (atm) | Polymerization Time (hr) | Partial pressure of gas (CO:C2H4) |
|---|---|---|---|---|---|---|---|---|---|---|---|
| Ex. 1 | 3.8 | 22.3 | 20.6 | 0.60 | 36 | 44 | 1:1 | 90 | 110 | 1 | 1:1 |
| Ex. 2 | 6.1 | 14.0 | 12.6 | 0.60 | 36 | 44 | 1:1 | 80 | 110 | 1 | 1:1 |
| Ex. 3 | 3.3 | 11 | 9.89 | 0.60 | 36 | 44 | 1:1 | 70 | 45 | 1 | 1:1 |
| Ex. 4 | 11.1 | 4 | 14.4 | 0.60 | 36 | 44 | 1:1 | 60 | 110 | 4 | 1:1 |
| Ex. 5 | 4.5 | 20.3 | 36.51 | 0.60 | 48 | 32 | 1:1 | 90 | 110 | 2 | 1:1 |
| Ex. 6 | 10.3 | 6.1 | 21.95 | 0.60 | 48 | 32 | 1:1 | 70 | 110 | 4 | 1:1 |

PdCl2: palladium cholride
BDOMPP: 1,3-bis[di(methoxyphenyl)phosphino]propane

Comparative Example 1

0.150 mg of palladium chloride and 0.450 mg of 1,3-bis[di(methoxyphenyl)phosphino]propane were dissolved in the mixture of 36 ml of acetic acid and 44 ml of water. After removing the air from the obtained solution under vacuum, the solution was charged into a stainless-steel autoclave which had been purged with nitrogen. After sealing the autoclave, the contents were heated under stirring at a speed of 700 rpm. When the internal temperature reached 90° C., a mixed gas of carbon monoxide and ethylene (the molar ratio of 1:1) was added until the internal pressure of the autoclave became 110 atm. The contents were stirred for 1 hour while the internal temperature and the internal pressure were maintained at 90° C. and 110 atm, respectively. After cooling, the contents were taken out from the autoclave which had been degassed. The solution was filtered and then washed with acetone several times. The solution was dried under reduced pressure at room temperature to 80° C., to obtain 13.67 g of a polymer.

The results of 13C-NMR and IR confirmed that the polymer was polyketone which substantially consists of repeating units each derived from carbon monoxide and ethylene. The catalytic activity was equal to 15200 g/g-Pd·hr, and the intrinsic viscosity was 2.1 dl/g.

The results are summarized in Table 2.

Comparative Example 2

0.150 mg of palladium chloride and 0.450 mg of 1,3-bis[di(methoxyphenyl)phosphino]propane were dissolved in the mixture of 36 ml of acetic acid and 44 ml of water. After removing the air from the obtained solution under vacuum, the solution was charged into a stainless-steel autoclave which had been purged with nitrogen. After sealing the autoclave, the contents were heated under stirring at a speed of 700 rpm. When the internal temperature reached 80° C., a mixed gas of carbon monoxide and ethylene (the molar ratio of 1:1) was added until the internal pressure of the autoclave became 110 atm. The contents were stirred for 1 hour while the internal temperature and the internal pressure were maintained at 80° C. and 110 atm, respectively. After cooling, the contents were taken out from the autoclave which had been degassed. The solution was filtered and then washed with acetone several times. The solution was dried under reduced pressure at room temperature to 80° C., to obtain 9.0 g of a polymer.

The results of 13C-NMR and IR confirmed that the polymer was polyketone which substantially consists of repeating units each derived from carbon monoxide and ethylene. The catalytic activity was equal to 10000 g/g-Pd·hr, and the intrinsic viscosity was 4.5 dl/g.

The results are summarized in Table 2.

Comparative Example 3

0.150 mg of palladium chloride and 0.450 mg of 1,3-bis[di(methoxyphenyl)phosphino]propane were dissolved in the mixture of 36 ml of acetic acid and 44 ml of water. After removing the air from the obtained solution under vacuum, the solution was charged into a stainless-steel autoclave which had been purged with nitrogen. After sealing the autoclave, the contents were heated under stirring at a speed of 700 rpm. When the internal temperature reached 70° C., a mixed gas of carbon monoxide and ethylene (the molar ratio of 1:1) was added until the internal pressure of the autoclave became 45 atm. The contents were stirred for 1 hour while the internal temperature and the internal pressure were maintained at 70° C. and 45 atm, respectively. After cooling, the contents were taken out from the autoclave which had been degassed. The solution was filtered and then washed with acetone several times. The solution was dried under reduced pressure at room temperature to 80° C., to obtain 5.57 g of a polymer.

The results of 13C-NMR and IR confirmed that the polymer was polyketone which substantially consists of repeating units each derived from carbon monoxide and ethylene. The catalytic activity was equal to 6200 g/g-Pd·hr, and the intrinsic viscosity was 2.2 dl/g.

The results are summarized in Table 2.

Comparative Example 4

0.150 mg of palladium chloride and 0.450 mg of 1,3-bis[di(methoxyphenyl)phosphino]propane were dissolved in the mixture of 36 ml of acetic acid and 44 ml of water. After removing the air from the obtained solution under vacuum, the solution was charged into a stainless-steel autoclave which had been purged with nitrogen. After sealing the autoclave, the contents were heated under stirring at a speed of 700 rpm. When the internal temperature reached 60° C., a mixed gas of carbon monoxide and ethylene (the molar ratio of 1:1) was added until the internal pressure of the autoclave became 110 atm. The contents were stirred for 1 hour while the internal temperature and the internal pressure were maintained at 60° C. and 110 atm, respectively. After cooling, the contents were taken out from the autoclave which had been degassed. The solution was filtered and then washed with acetone several times. The solution was dried under reduced pressure at room temperature to 80° C., to obtain 9.0 g of a polymer.

The results of 13C-NMR and IR confirmed that the polymer was polyketone which substantially consists of repeating units each derived from carbon monoxide and ethylene. The catalytic activity was equal to 2500 g/g-Pd·hr, and the intrinsic viscosity was 6.5 dl/g.

The results are summarized in Table 2.

Comparative Example 5

0.150 mg of palladium chloride and 0.450 mg of 1,3-bis[di(methoxyphenyl)phosphino]propane were dissolved in the mixture of 48 ml of acetic acid and 32 ml of water. After removing the air from the obtained solution under vacuum, the solution was charged into a stainless-steel autoclave which had been purged with nitrogen. After sealing the autoclave, the contents were heated under stirring at a speed of 700 rpm. When the internal temperature reached 90° C., a mixed gas of carbon monoxide and ethylene (the molar ratio of 1:1) was added until the internal pressure of the autoclave became 110 atm. The contents were stirred for 2 hour while the internal temperature and the internal pressure were maintained at 90° C. and 110 atm, respectively. After cooling, the contents were taken out from the autoclave which had been degassed. The solution was filtered and then washed with acetone several times. The solution was dried under reduced pressure at room temperature to 80° C., to obtain 25.17 g of a polymer.

The results of 13C-NMR and IR confirmed that the polymer was polyketone which substantially consists of repeating units each derived from carbon monoxide and ethylene. The catalytic activity was equal to 14000 g/g-Pd·hr, and the intrinsic viscosity was 2.6 dl/g.

The results are summarized in Table 2.

Comparative Example 6

0.150 mg of palladium chloride and 0.450 mg of 1,3-bis[di(methoxyphenyl)phosphino]propane were dissolved in the mixture of 48 ml of acetic acid and 32 ml of water. After removing the air from the obtained solution under vacuum, the solution was charged into a stainless-steel autoclave which had been purged with nitrogen. After sealing the autoclave, the contents were heated under stirring at a speed of 700 rpm. When the internal temperature reached 70° C., a mixed gas of carbon monoxide and ethylene (the molar ratio of 1:1) was added until the internal pressure of the autoclave became 110 atm. The contents were stirred for 4 hour while the internal temperature and the internal pressure were maintained at 70° C. and 110 atm, respectively. After cooling, the contents were taken out from the autoclave which had been degassed. The solution was filtered and then washed with acetone several times. The solution was dried under reduced pressure at room temperature to 80° C., to obtain 14.39 g of a polymer.

The results of 13C-NMR and IR confirmed that the polymer was polyketone which substantially consists of repeating units each derived from carbon monoxide and ethylene. The catalytic activity was equal to 4000 g/g-Pd·hr, and the intrinsic viscosity was 7.0 dl/g. The results are summarized in Table 2.

TABLE 2

| | Catalytic | | | Catalyst system [Amount of catalyst input (mg)] | | Solvent (ml) | | Input ratio | Rx | Rx | | Partial pressure |
| | I.V. | Activity | Amount | | | | | Ligand/ | Temp | Pressure | Polymerization | of gas |
| | (dl/g) | (kg/gPd · hr) | produced(g) | PdCl2 | BDOMPP | acetic acid | water | pd | (°C.) | (atm) | Time (hr) | (CO:C2H4) |
|---|---|---|---|---|---|---|---|---|---|---|---|---|
| Comp. Ex. 1 | 2.1 | 15.2 | 13.67 | 0.150 | 0.450 | 36 | 44 | 1:1 | 90 | 110 | 1 | 1:1 |
| Comp. Ex. 2 | 4.5 | 10.0 | 9.0 | 0.150 | 0.450 | 36 | 44 | 1:1 | 80 | 110 | 1 | 1:1 |
| Comp. Ex. 3 | 2.2 | 6.2 | 5.57 | 0.150 | 0.450 | 36 | 44 | 1:1 | 70 | 45 | 1 | 1:1 |
| Comp. Ex. 4 | 6.5 | 2.5 | 9.0 | 0.150 | 0.450 | 36 | 44 | 1:1 | 60 | 110 | 4 | 1:1 |
| Comp. Ex. 5 | 2.6 | 14.0 | 25.17 | 0.150 | 0.450 | 48 | 32 | 1:1 | 90 | 110 | 2 | 1:1 |
| Comp. Ex. 6 | 7.0 | 4.0 | 14.39 | 0.150 | 0.450 | 48 | 32 | 1:1 | 70 | 110 | 4 | 1:1 |

Effects of Invention

According to the present invention, a process for preparing polyketone is provided wherein a mixed solvent of 40 to 60 mol % acetic acid and 40 to 60 mol % water, as a liquid medium, and the precursor of palladium chloride-1,3-bis[di(methoxyphenyl)phosphino]propane, as a catalyst component, are used to improve catalytic activity and intrinsic viscosity suitable for the use as a tire cord.

The invention claimed is:

1. A process for preparing a polyketone,
   wherein the polyketone is copolymerized with carbon monoxide and an ethylene at a temperature of 90° C. and a pressure of 110 bar in a mixture ratio of 40 to 60 mol % acetic acid and 40 to 60 mol % water as a liquid medium and in the presence of a catalyst precursor produced by coupling palladium chloride and 1,3-bis[di(methoxyphenyl)phosphino]propane.

2. The process for preparing a polyketone according to claim 1, wherein the palladium chloride and the 1,3-bis[di(methoxyphenyl)phosphino]propane is input at a molar ratio of 1:1.

* * * * *